Figure 1:
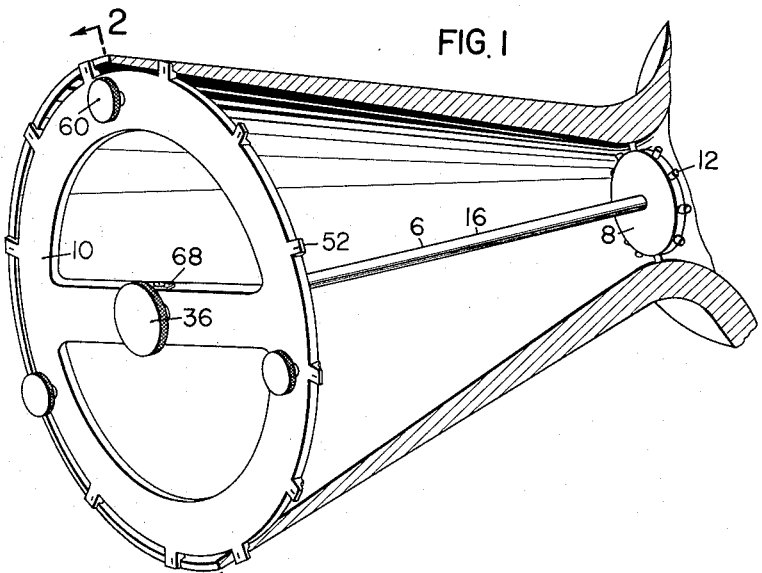

May 10, 1966 R. L. BELL 3,250,013
MEASURING INSTRUMENT
Filed June 1, 1962 2 Sheets-Sheet 1

*INVENTOR.*
Robert L. Bell
BY
*Curtis, Morris & Safford*
Attorneys

May 10, 1966  R. L. BELL  3,250,013
MEASURING INSTRUMENT
Filed June 1, 1962
2 Sheets-Sheet 2
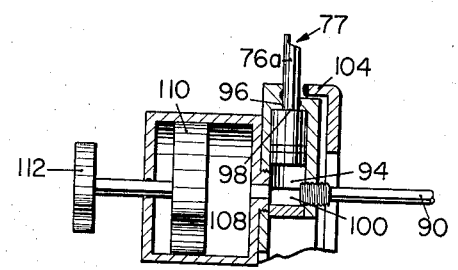
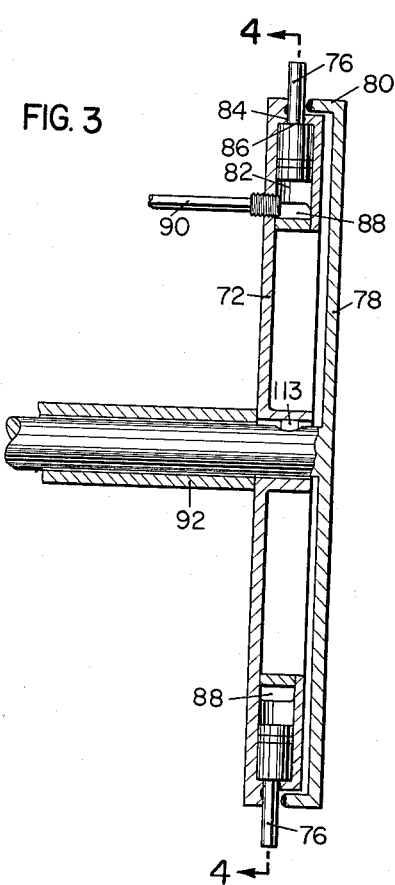
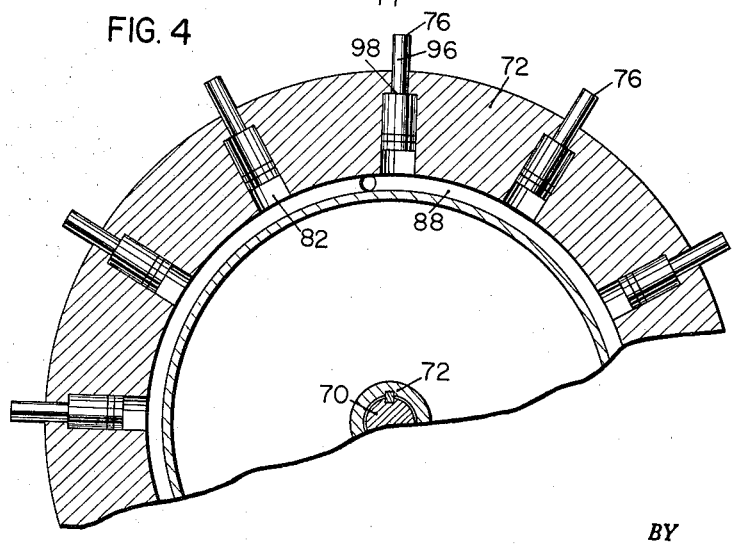
FIG. 3
FIG. 4
INVENTOR.
Robert L. Bell
BY
Curtis, Morris & Safford
Attorneys

United States Patent Office 3,250,013
Patented May 10, 1966

1

3,250,013
MEASURING INSTRUMENT
Robert L. Bell, Logan, Utah, assignor to Thiokol Chemical Corporation, Bristol, Pa., a corporation of Delaware
Filed June 1, 1962, Ser. No. 199,345
4 Claims. (Cl. 33—178)

This invention relates to instruments for taking measurements of the interiors of open, hollow articles and, more particularly, it relates to instruments for taking cross-sectional measurements of the interiors of rocket nozzles or similar articles in which such cross sections are not necessarily circular.

It is current practice to evaluate the probable performance of a given kind of rocket motor by a static or captive test in which the rocket motor is firmly mounted in a stationary manner and heavily instrumented to indicate any variation of pressure, thrust, etc. Two of the critical parameters which are carefully noted during such static tests are (1) the area of the throat and (2) the angle of the exit cone of the rocket nozzle. This is because there is a definite relationship between these parameters and the thrust, and, hence, the acceleration and velocity that the rocket would have in flight. Even a minute variation in the diameter of the throat would have a noticable effect upon the velocity of the rocket, and, because of the erosive nature of the combustion products of the propellant, such a dimensional variation almost inevitably occurs during the operation of the rocket motor. Hence, measurements of the throat diameter and of the exit cone diameter are carefully taken both before and after such a static test.

In current practice these dimensions are obtained using inside micrometers. However, with these instruments it is difficult to obtain measurements accurately at the required angular increments in the throat section of a nozzle, because the area in which measurements must be taken is too restricted for using such a measuring device. The operator using such a device must position the micrometer perpendicularly to the throat surface without the benefit of a definite reference point from which to measure. Also, when measuring the exit cone the operator must position the micrometer at the exit plane of the nozzle and take measurements from a line that may not exist because of the erosion of the nozzle near its terminal plane.

Another parameter which must be known, and for which there is no current method of ascertaining, is the exact position of the thrust vector relative to the central axis of the rocket motor. Various existing devices for measuring similar open hollow articles have been found incapable of measuring internal shapes which are non-circular. This, of course, renders such instruments useless for the purpose of measuring rocket nozzles because of the fact that an eroded nozzle is very often noncircular in internal cross section.

My invention comprises essentially a plurality of extensible fingers, capable of independent motion and capable of being clamped in position when they have contacted the article to be measured. These fingers are supported on an elongated handle.

It is an object of my invention to provide an instrument for taking accurate measurements of cross sections of the interior of the hollow article, the interior of which is not necessarily circular or regular in shape.

Another object of my invention is to provide an instrument with which accurate measurements of the throat and exit cone of a rocket nozzle may be simultaneously taken.

Another object of my invention is to provide an instrument that permits location of the true position of the thrust vector relative to the central axis of a rocket motor or missile.

Another object of my invention is to provide an instrument which makes possible extreme accuracy and consistency in such measurements, if they are taken by the same operator, by his own subjective sense of touch.

Other objects and advantages of the invention will become apparent as the following description is read with reference to the accompanying drawings, wherein identical characters indicate corresponding parts throughout the several views.

Figure 2:
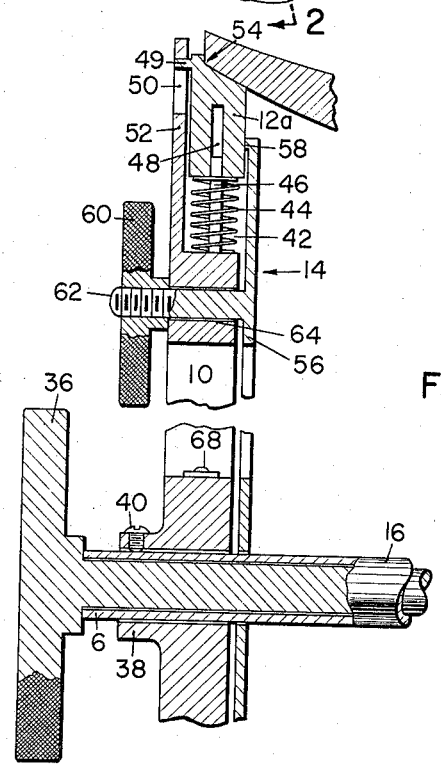
Figure 2:
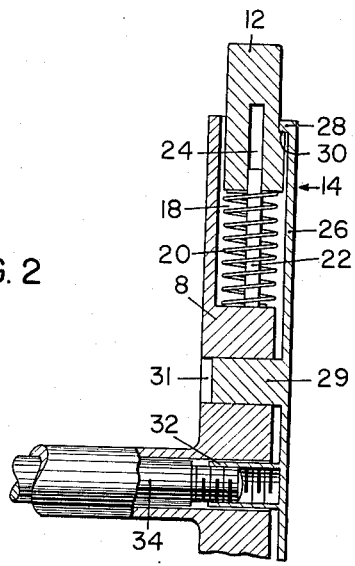

Referring now to the drawings:
FIGURE 1 is a perspective view of a typical rocket nozzle and showing the measuring instrument of the present invention applied thereto to illustrate the way in which it would be ordinarily used;
FIGURE 2 is an enlarged fragmentary sectional view of the measuring instrument taken on the line 2—2 of FIGURE 1;
FIGURE 3 is a fragmentary sectional view similar to FIGURE 2 but showing the measuring instrument equipped with a hydraulic or pneumatic system for extending the fingers; and
FIGURE 4 is a fragmentary sectional view taken on the line 4—4 of FIGURE 3.

The invention as illustrated in FIGURES 1 and 2 consists essentially of an elongated handle 6 on which is mounted two disk-shaped supports 8 and 10 having extensible fingers 12 and 12A, respectively, seated in the supports and clamping means 14 for clamping the fingers into any given position. As the device of the present invention is for the purpose of accurately measuring cross sections which may be irregular or noncircular, it is necessary to measure the contour at a number of points greater than three, and in the illustrated embodiment, twelve extensible fingers 12 and 12A are provided on each of the supports 8 and 10, respectively, to measure the contour of the cross section at 30° increments.

The support 8 is a disk attached at its center to a long tube 16, which forms a part of the handle 6. Support 8 also has near its outer edge open finger seats 18 for fingers 12. The finger seats 18 are equipped with compression springs 20 and spring guides 22 that extend into recesses 24 in fingers 12. A parallel disk 26 completes the finger seats 18 and in addition has an annular flange 28 oriented toward fingers 12. This flange may act as a detent to limit the outward extension of the fingers when the annular flange contacts shoulders 30 of the fingers 12. Disk 26 is further equipped with a central tube 32 which fits inside of tube 16 and is internally threaded to receive the threaded end of the long rod 34 which extends internally throughout the length of the tube 16 and terminates in a hand wheel 36. Hence, by rotation of the hand wheel 36, the disk 26 may be drawn tightly against the fingers 12 causing the annular flange 28 on the disk 26 to act as a clamp against the fingers 12 and fix them firmly in any given position. A projection 29 on disk 26 fits into hole 31 in support 10, preventing relative rotation thereof. The support 10 is also disk-like in form and has a short, central sleeve 38 equipped with a set screw 40 for longitudinal adjustment of support 10 on tube 16 relative to support 8. The outer edge of support 10 is equipped with radial finger seats 42 which are equipped with compression springs 44 on guides 46, the guides extending into recesses 48 in the fingers 12A. Each finger 12A is equipped with a small projection 49 which rides in a slot 50 in a small radially-projecting ear 52 on the outer edge of support 10. As shown in FIGURE 2, the projection 49 and slot 50 serve the dual purpose of guide for finger 12A and detent for limiting the outward movement of the fingers. The outwardly projecting end of each finger 12A is also notched at 54, the inner surface of notch 54 serving as the measuring surface and the adjacent surface of notch 54, which is substantially parallel to the plane of support 10, serving as an automatic locating device to position the entire instrument relative to the nozzle to be measured by contacting the outer edge of the nozzle, as shown in FIGURE 2. A parallel disk 56 similar to disk 26 also has an annular flange 58. Disk 56 and its flange 58 operate in a manner identical to that of disk 26 and its flange 28, with the exception that the fingers 12A are confined by drawing disk 56 and support 10 together by means of a plurality of handwheels 60 that are internally-threaded to receive threaded studs 62 fixed to and projecting from disk 56. Support 10 is also equipped with a level-indicating device 68.

In operation, all of the handwheels 36 and 60 are loosened slightly to allow freedom of movement to the extensible fingers 12 and 12A. The instrument is then inserted into the nozzle to be measured in a manner such that the level-indicating device 68 indicates that the instrument is at the desired position about its axis and that the inner edge of the terminal plane of the nozzle fits into notches 54 of the fingers 12A. The handwheel 36 is then rotated to clamp the fingers 12 into the position which they have automatically assumed and which, when the instrument is withdrawn, will indicate the exact internal contour of the rocket nozzle throat. For the same purpose the handwheels 60 are rotated to clamp the fingers 12A into the position which they have assumed. The instrument is then withdrawn and the diameters across opposite fingers on each support 8 and 10 are measured to indicate corresponding diameters of the rocket nozzle throat and of the outer edge of the nozzle.

FIGURES 3 and 4 illustrate an alternate form of my invention in which the means for extending the fingers outwardly is a pneumatic or hydraulic system rather than spring loading, as previously described. Also, a slightly different form of the clamping means is illustrated in these figures. However, the general structure of this form of the invention is very similar to that described above in that it has an elongated handle 70, a small support 72, a large support 74, and fingers 76 and 76A, respectively, extending radially from these supports. However most of the elements are modified slightly.

A disk 78 having an annular flange 80 is attached at its central portion to the handle 70 with the flange 80 oriented toward the opposite end of the handle. Adjacent to this disk on handle 70 is a support 72 having radially extending fingers 76 seated for free longitudinal movement in cylindrical finger seats 82. Each finger seat 82 has a constriction 84 at its outer end which may contact a shoulder 86 on each cylindrical finger 76 to limit outward extension thereof. Each finger seat 82 is connected by a continuous annular duct 88 which is in communication with a tube 90 for conveyance of a hydraulic or pneumatic fluid.

A second and larger support 74 is also mounted upon the handle 70 and is fixed a given distance relative to support 72 by a long sleeve 92, which is confined between the two supports on handle 70. This arrangement may, of course, be similar to that of FIGURE 2, which permits adjustment of the two supports relative to one another. The support 74 is identical in structure to the support 72, in that it has fingers 76A in finger seats 94 which have constriction 96 to contact shoulders 98 of the fingers, an annular duct 100 connecting the finger seats and being in communication with the tube 90, and also is adjacent to a disk 102 having an annular flange 104 oriented toward the fingers 76A. Differences in the structure, however, are that the disk 102 is equipped with an aperture 106 to allow passage of tube 90 therethrough, and that the outer ends of fingers 76A are notched at 77 as are fingers 12A. The support 74 is equipped with a closed chamber 108 which contains either hydraulic fluid or air. A means for decreasing the volume of this chamber, such as the piston 110, may be actuated manually by means of the handle 112 to force fluid into all finger seats simultaneously and with equal pressure.

Keys and keyways 113 prevent rotation of supports 72 and 74, and seals prevent fluid leaks.

In operation, this form of the invention is used in a manner identical to the form described above with the exceptions that (1) it enables measurements to be somewhat subjectively controlled by the operator, since the operator may by sense of touch adjust the pressure of the fingers against the piece to be measured; and (2) all fingers of both supports 72 and 74 may be clamped in place simultaneously by a single rotation of handwheel 114 when the desired pressure is obtained on the fingers. Handwheel 114 is internally threaded to receive the threaded end of the handle 70.

It may be noted that the invention herein described in two alternate embodiments comprises essentially an elongated handle having two supports thereon for support of radially extensive fingers which may contact the interior surface of an article to be measured. It may also be noted that the motion of any one of these extensible fingers is completely unrestricted by restrictions of motions of any of the other fingers and that, therefore, cavities which are irregular may be measured as readily as those that are regular or circular in cross section. It may be also noted that the various elements of the invention described in detail may be varied considerably without departing from the spirit or the scope of the invention. For example, the clamping means for clamping the fingers into the desired position may assume many forms including individual set screws impinging against individual fingers; the pneumatic and hydraulic extending means for extending the fingers may incorporate bladders; and various arrangements of the supports, clamping disks, and the spacing sleeve are possible.

I claim:

1. An instrument for measuring interior cross sections, which are not necessarily regular or circular, of an open, hollow article comprising
   (a) a handle,
   (b) a plurality of support mounted on said handle with each support comprising spaced disks formed to provide a plurality of pairs of diametrically opposed radially extending recesses therebetween,
   (c) an extensible finger seated in each of said recesses for longitudinal sliding motion in said recess to extend radially therefrom in a common plane and at least one of each of said pairs of disks being mounted for movement relative to the other disk of said pair and having means to engage each of the fingers, one of said disks of each support having a projection that fits in a hole in the other disk to prevent relative rotation,
   (d) detents on said support to limit outward movement of said fingers,
   (e) extending means in each recess for extending each of said fingers independently of the other fingers, and clamping means for drawing the spaced disks of the support toward each other for clamping said fingers therebetween in a given position.

2. The instrument as recited in claim 1 wherein said extending means is an individual spring for outward extension of each of said fingers.

3. The instrument as recited in claim 1 wherein said extending means is a pneumatic system comprising
   (a) a closed chamber for gas, said chamber being in communication with the seats for said fingers, and
   (b) a means for decreasing the volume of said chamber; whereby gas is forced into said finger seats.

4. The instrument as recited in claim 1 wherein said extending means is a hydraulic system comprising (a) a closed chamber for liquid, said chamber being in communication with the seats for said fingers, and
(b) a means for decreasing the volume of said chamber, whereby liquid is forced into said finger seats.

References Cited by the Examiner

UNITED STATES PATENTS 2,540,282    2/1951    Oliver  ---------------- 33—174

FOREIGN PATENTS

| 974,319 | 11/1960 | Germany. |
| 3,167 | 9/1873 | Great Britain. |
| 25,408 | 9/1911 | Great Britain. |
| 257,758 | 10/1948 | Switzerland. |

LOUIS R. PRINCE, *Primary Examiner.*

ISAAC LISANN, ROBERT B. HULL, *Examiners.*